No. 621,328.  
A. COOPER.  
RULING MACHINE.  
(Application filed May 28, 1898.)  
Patented Mar. 21, 1899.
(No Model.)
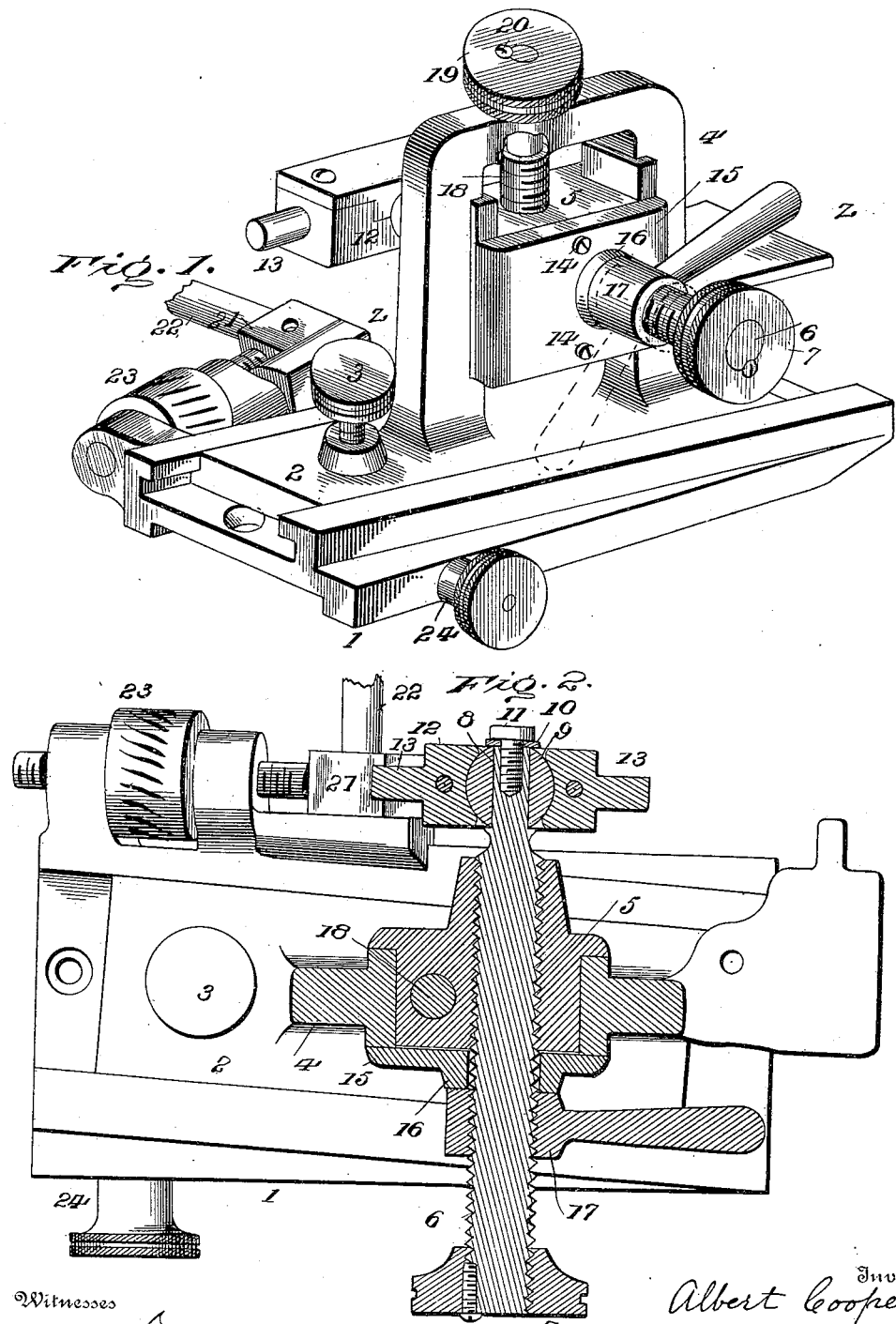

UNITED STATES PATENT OFFICE.

ALBERT COOPER, OF HARRISBURG, PENNSYLVANIA, ASSIGNOR TO THE
W. O. HICKOK MANUFACTURING COMPANY, OF SAME PLACE.

RULING-MACHINE.

SPECIFICATION forming part of Letters Patent No. 621,328, dated March 21, 1899.

Application filed May 28, 1898. Serial No. 682,029. (No model.)

*To all whom it may concern:*

Be it known that I, ALBERT COOPER, a citizen of the United States, residing at Harrisburg, in the county of Dauphin and State of Pennsylvania, have invented a certain new and useful Improvement in Ruling-Machines, of which the following is a specification, reference being had to the accompanying drawings.

This invention is designed to provide the style of ruling-machine shown in Patent No. 558,764 with an adjusting device, whereby the vertical and lateral adjustments of the pen-beam are both securely held by a single lock-nut; and to this end the invention consists in the peculiar construction, arrangement, and combinations of parts hereinafter more particularly described and then definitely claimed at the end hereof.

In the accompanying drawings, Figure 1 is a perspective view of the beam-carriage device of a ruling-machine. Fig. 2 is a horizontal section through the line *z z*.

Referring now to the details of the drawings by numerals, 1 represents a base in which is fitted the slide 2, having an adjusting-screw 3 and carrying the yoke 4, in which slides the threaded bearing 5 for a screw 6, which latter has a milled head 7 at one end and a reduced portion 8 at the other to receive a ball 9, which is securely held there by a washer 10 and screw 11. This ball works in a box 12, having trunnions 13, on which is to be hung the usual or any convenient plate for carrying the pen-beam.

Connected to the bearing 5 by screws 14 is a plate 15, having a boss 16, against which bears one side of the lock-nut 17 when the latter is in action.

Passing through the top of the yoke is a screw 18, whose lower or threaded part works in a female thread in the bearing 5; but the part that works in the yoke is reduced and has no thread. On its top is a milled head 19, secured by a screw 20.

At 21 is shown a bearing-block for the gate-shaft 22, which is operated by means of a worm-nut 23 and screw 24; but as these are substantially the same as in the aforesaid patent further description is unnecessary.

By the above arrangement a very convenient and rapidly-acting device for adjusting the position of the pen-beam is provided. When the lock-nut 17 is turned in the position shown in dotted lines, the screw 6 can be readily turned to move the pen-beam longitudinally, and by turning the screw 18 the bearing 5 can be easily raised or lowered, as desired. When the beam has been adjusted, the lock-nut is turned, as shown in full lines, which not only locks the screw 6 from turning, but as the lock-nut acts against the plate 15 it pushes it toward the yoke 4, and at the same time by means of the screw 6 draws the bearing 5 toward the yoke, and thus by the joint action of the plate 15 and bearing 5 the latter firmly clamps the sides of the yoke, and the bearing is thus held from any movement.

Although the adjusting device is intended to be used mainly with ruling-machines of the class shown in the above-mentioned patent, it is evident that its use is not limited to that class of machine, as it may be found very useful on others.

What I claim as new is—

1. The combination in a ruling-machine and with the pen-beam thereof, of a yoke, a bearing-block closely fitting in said yoke and having a portion acting against one side of the same, and a horizontal screw-threaded hole therein, a plate connected thereto acting against the other side of the yoke, a screw working in said threaded hole, a lock-nut bearing against the plate and a ball-and-socket joint adapted to connect with the pen-beam, substantially as described.

2. The combination in a ruling-machine and with the pen-beam thereof, of a yoke, a bearing-block closely fitting in said yoke, and having a portion acting against one side of the same, and a horizontal screw-threaded hole therein, a plate connected thereto acting against another side of the yoke, a screw working in said threaded hole connected at one end with the pen-beam, and having on it a lock-nut forcing said plate against the yoke, and an adjusting-screw set in the yoke and screwing into the bearing to raise and lower the pen-beam, substantially as described.

In testimony whereof I affix my signature, in the presence of two witnesses, this 27th day of May, 1898.

ALBERT COOPER.

Witnesses:
R. S. CARE,
S. SCHRIVER.